(12) United States Patent
Yuan et al.

(10) Patent No.: US 8,671,395 B1
(45) Date of Patent: Mar. 11, 2014

(54) ADAPTIVE DEADEND AVOIDANCE IN CONSTRAINED SIMULATION

(75) Inventors: Jun Yuan, San Ramon, CA (US); Akok Jain, New Delhi (IN); Manpreet Singh Reehal, Punjab (IN); Vinaya Kumar Singh, Noida (IN)

(73) Assignee: Cadence Design Systems, Inc., San Jose, CA (US)

( * ) Notice: Subject to any disclaimer, the term of this patent is extended or adjusted under 35 U.S.C. 154(b) by 679 days.

(21) Appl. No.: 12/879,458

(22) Filed: Sep. 10, 2010

(51) Int. Cl.
*G06F 9/44* (2006.01)
*G06F 9/455* (2006.01)

(52) U.S. Cl.
USPC .............................. 717/126; 717/135; 716/106

(58) Field of Classification Search
None
See application file for complete search history.

(56) References Cited

U.S. PATENT DOCUMENTS

| | | | |
|---|---|---|---|
| 6,289,502 B1 * | 9/2001 | Garland et al. | 717/126 |
| 6,973,417 B1 * | 12/2005 | Maxwell et al. | 717/135 |
| 7,076,753 B2 * | 7/2006 | Cerny et al. | 716/106 |
| 7,266,476 B2 * | 9/2007 | Coburn et al. | 717/135 |
| 7,343,590 B2 * | 3/2008 | Tormey et al. | 717/135 |
| 7,398,515 B2 * | 7/2008 | Atoji et al. | 717/126 |
| 7,454,727 B1 * | 11/2008 | Cerny et al. | 716/106 |
| 7,694,253 B2 * | 4/2010 | Campos et al. | 716/106 |
| 7,788,616 B2 * | 8/2010 | Baumgartner et al. | 716/106 |
| 7,793,242 B2 * | 9/2010 | Baumgartner et al. | 716/106 |
| 7,844,944 B2 * | 11/2010 | Gutberlet et al. | 717/135 |
| 8,140,459 B2 * | 3/2012 | Bjorner et al. | 717/126 |
| 8,316,332 B1 * | 11/2012 | Goyal et al. | 716/106 |
| 8,365,110 B2 * | 1/2013 | Chang et al. | 717/126 |
| 2004/0103396 A1 * | 5/2004 | Nehab | 717/135 |
| 2007/0294655 A1 * | 12/2007 | Campos et al. | 716/106 |
| 2008/0066033 A1 * | 3/2008 | Baumgartner et al. | 716/106 |
| 2012/0084759 A1 * | 4/2012 | Candea et al. | 717/126 |

OTHER PUBLICATIONS

Dsouza, "Static analysis of deadends in SVA constraints", Jun. 2010, IEEE; [retrieved on Mar. 4, 2013]; Retrieved from Internet <URL:http://ieeexplore.ieee.org/stamp/stamp.jsp?tp=&arnumber=5496656>;pp. 82-89.*

Cerny, et al., "Supporting Sequential Assumptions in Hybrid Verification", 2005, IEEE; [retrieved on Mar. 4, 2013]; Retrieved from Internet <URL:http://ieeexplore.ieee.org/stamp/stamp.jsp?tp=&arnumber=1466517>;pp. 1035-1038.*

Yuan, et al., "Modeling Design Constraints and Biasing in Simulation Using BDDs"; 1999, IEEE; [retrieved on Oct. 16, 2013]; Retrieved from Internet <URL:http://dl.acm.org/citation.cfm?id=339492>;pp. 584-589.*

Baumgartner, et al., "Optimal Constraint-Preserving Netlist Simplification"; 2008 IEEE; [retrieved on Oct. 16, 2013]; Retrieved from Internet <URL:http://dl.acm.org/citation.cfm?id=1517427>;pp. 1-9.*

(Continued)

*Primary Examiner* — Thuy Dao
*Assistant Examiner* — Xi D Chen
(74) *Attorney, Agent, or Firm* — Holland & Knight LLP; Mark H. Whittenberger, Esq.

(57) ABSTRACT

The present disclosure relates to a method for avoiding deadends in a constrained simulation. The method may include analyzing a first deadend during a simulation and a first constraint of the simulation. The method may further include determining if the first constraint causes the first deadend. If the first constraint causes the first deadend, the method may also include defining a first lookahead constraint corresponding to the first constraint. The method may additionally include rerunning a first previous cycle in the simulation while adding the first lookahead constraint to the simulation.

21 Claims, 5 Drawing Sheets

(56) References Cited

OTHER PUBLICATIONS

Andreev, et al., "Tapered Transmissin Gate Chains for Improved Carry Propagation"; 2002 IEEE; [retrieved on Oct. 16, 2013]; Retrieved from Internet <URL:http://ieeexplore.ieee.org/stamp/stamp.jsp?tp=&arnumber=1187070>;pp. 449-452.*

Liu, et al., "Hierarchical Instruction Encoding for VLIW Digital Signal Processors"; 2005 IEEE;[retrieved on Oct. 16, 2013]; Retrieved from Internet <URL:http://ieeexplore.ieee.org/stamp/stamp.jsp?tp=&arnumber=1465384>;pp. 3503-3506.*

Cerny et al., "Supporting Sequential Assumptions in Hybrid Verification," Automation Conference, 2005., IEEE, Proceedings of the ASP-DAC 2005. Asia and South Pacific vol. 2, Jan. 18-21, 2005 pp. 1035-1038.

Baumgartner et al., "Optimal Constraint-Preserving Netlist Simplification," Formal methods in Computer-Aided Design, 2008, FMCAD, IEEE Nov. 17-20, 2008, pp. 1-9, Digital Object Identifier 10.1109/FMCAD.2008.ECP.7.

Yuan et al., "Constraint-Based Verification," 2010 Springer Science & Business Media, Inc., pp. 1-253.

* cited by examiner

ADAPTIVE DEADEND AVOIDANCE IN CONSTRAINED SIMULATION

FIELD OF THE INVENTION

The embodiments of the present disclosure relate to a method of adaptive deadend avoidance, and more particularly, to a method of adaptive deadend avoidance in constrained simulation. Although embodiments of the present disclosure may be suitable for a wide scope of applications, one or more embodiments may be configured to adaptively avoid deadends in a constrained simulation of an electronic device design.

BACKGROUND

In general, it may be desirable to identify errors in an electronic device design during a design phase. An electronic device design process may have a design component and a verification component. The design component may lay out what the device will do, and the verification component may validate that the implementation of the design is correct.

Simulation may be a method of verification and may include a testbench. The testbench may be replaced or enhanced by using a constrained simulation. One obstacle in a constrained simulation may be constraint conflicts, sometimes referred to as deadends. Deadends may stall the simulation until a designer manually modifies the constraints and/or the design to remove the deadend.

SUMMARY OF INVENTION

Accordingly, an embodiment of the present disclosure is directed to a method for adaptive deadend avoidance in constrained simulation. In some embodiments, the method may include analyzing, via a computing device, a first deadend during a simulation and a first constraint of the simulation. The method may further include determining, via the computing device, if the first constraint causes the first deadend. If the first constraint causes the first deadend, the method may also include defining, via the computing device, a first lookahead constraint corresponding to the first constraint. Moreover, the method may include rerunning, via the computing device, a first previous cycle in the simulation while adding the first lookahead constraint to the simulation.

One or more of the following features may be included. The method may further include avoiding the first deadend by applying the first lookahead constraint to the simulation. If rerunning the first previous cycle during the simulation leads to a second deadend, the method may additionally include analyzing the second deadend in the simulation and a second constraint of the simulation. The method may also include determining if the second constraint causes the second deadend. If the second constraint causes the second deadend, the method may further include defining a second lookahead constraint corresponding to the second constraint. The method may also include rerunning a second previous cycle in the simulation while adding the second lookahead constraint to the simulation. The method may additionally include avoiding the second deadend by applying the second lookahead constraint to the simulation. The method may further include iteratively applying the analyzing, determining, defining, rerunning, and avoiding operations during the simulation until all deadends in the simulation have been avoided.

In some implementations, the method may include applying input valuation to the design being tested by the simulation and evaluating the design. The method may also include recording a lookahead history for the first constraint corresponding to the first deadend. If the first constraint is identified as causing the first deadend for a second time, the method may additionally include defining a two-cycle lookahead constraint. The method may also include rerunning the first previous cycle in the simulation while adding the two-cycle lookahead constraint to the simulation. Defining the two-cycle lookahead constraint may further include referring to the lookahead history for the first constraint. The two-cycle lookahead constraint may include the first lookahead constraint and a second lookahead constraint and may avoid the first deadend and a second deadend.

In another embodiment of the present disclosure a computer-readable storage medium having stored thereon instructions, which when executed by a processor result in a number of operations, is provided. Operations may include analyzing a first deadend during a simulation and a first constraint of the simulation. Operations may further include determining if the first constraint causes the first deadend. If the first constraint causes the first deadend, operations may further include defining a first lookahead constraint corresponding to the first constraint. Operations may additionally include rerunning a first previous cycle in the simulation while adding the first lookahead constraint to the simulation.

One or more of the following features may be included. Operations may further include avoiding the first deadend by applying the first lookahead constraint to the simulation. If rerunning the first previous cycle during the simulation leads to a second deadend, operations may additionally include analyzing the second deadend in the simulation and a second constraint of the simulation. Operations may also include determining if the second constraint causes the second deadend. If the second constraint causes the second deadend, operations may include defining a second lookahead constraint corresponding to the second constraint. Operations may also include rerunning a second previous cycle in the simulation while adding the second lookahead constraint to the simulation. Operations may additionally include avoiding the second deadend by applying the second lookahead constraint to the simulation. Operations may further include iteratively applying the analyzing, determining, defining, rerunning, and avoiding operations during the simulation until all deadends in the simulation have been avoided.

In some implementations, the operations may include applying input valuation to the design being tested by the simulation and evaluating the design. The operations may also include recording a lookahead history for the first constraint corresponding to the first deadend. If the first constraint is identified as causing the first deadend for a second time, the operations may additionally include defining a two-cycle lookahead constraint. The operations may also include rerunning the first previous cycle in the simulation while adding the two-cycle lookahead constraint to the simulation. Defining the two-cycle lookahead constraint may further include referring to the lookahead history for the first constraint. The two-cycle lookahead constraint may include the first lookahead constraint and a second lookahead constraint and may avoid the first deadend and a second deadend.

In yet another embodiment of the present disclosure a computing system for deadend avoidance in a constrained simulation of a design is provided. In some embodiments the computing system may include at least one processor, at least one memory architecture coupled with the at least one processor and a first software module executed by the at least one processor, wherein the first software module is configured to analyze a first deadend during a simulation and a first constraint of the simulation. The computing system may further include a second software module executed by the at least one processor, wherein the second software module is configured to determine if the first constraint causes the first deadend. The computing system may further include a third software module executed by the at least one processor, wherein the third software module is configured to, if the first constraint causes the first deadend, define a first lookahead constraint corresponding to the first constraint. The computing system may further include a fourth software module executed by the at least one processor, wherein the fourth software module is configured to rerun a first previous cycle in the simulation while adding the first lookahead constraint to the simulation.

One or more of the following features may be included. The computing system may further include a fifth software module executed by the at least one processor, wherein the fifth software module is configured to avoid the first deadend by applying the first lookahead constraint to the simulation. The computing system may also include a sixth software module executed by the at least one processor, wherein the sixth software module is configured to, if rerunning the first previous cycle during the simulation leads to a second deadend, analyze the second deadend in the simulation and a second constraint of the simulation. The computing system may additionally include a seventh software module executed by the at least one processor, wherein the seventh software module is configured to determine if the second constraint causes the second deadend. The computing system may further include an eighth software module executed by the at least one processor, wherein the eighth software module is configured to, if the second constraint causes the second deadend, define a second lookahead constraint corresponding to the second constraint. The computing system may also include a ninth software module executed by the at least one processor, wherein the ninth software module is configured to rerun a second previous cycle in the simulation while adding the second lookahead constraint to the simulation. The computing system may additionally include a tenth software module executed by the at least one processor, wherein the tenth software module is configured to avoid the second deadend by applying the second lookahead constraint to the simulation. Moreover, the computing system may include an eleventh software module executed by the at least one processor, wherein the eleventh software module is configured to iteratively apply the analyzing, determining, defining, rerunning, and avoiding operations during the simulation until all deadends in the simulation have been avoided.

In some implementations, the computing system may further include a twelfth software module executed by the at least one processor, wherein the twelfth software module is configured to apply input valuation to the design being tested by the simulation. The computing system may also include a thirteenth software module executed by the at least one processor, wherein the thirteenth software module is configured to evaluate the design. The computing system may additionally include a fourteenth software module executed by the at least one processor, wherein the fourteenth software module is configured to record a lookahead history for the first constraint corresponding to the first deadend. Moreover, the computing system may include a fifteenth software module executed by the at least one processor, wherein the fifteenth software module is configured to, if the first constraint is identified as causing the first deadend for a second time, defining a two-cycle lookahead constraint. The computing system may further include a sixteenth software module executed by the at least one processor, wherein the sixteenth software module is configured to rerun the first previous cycle in the simulation while adding the two-cycle lookahead constraint to the simulation. Defining the two-cycle lookahead constraint may further include referring to the lookahead history for the first constraint. The two-cycle lookahead constraint may include the first lookahead constraint and a second lookahead constraint and may avoid the first deadend and a second deadend.

It is to be understood that both the foregoing general description and the following detailed description are exemplary and explanatory and are intended to provide further explanation of embodiments of the present disclosure as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure, and together with the description serve to explain the principles of embodiments of the present disclosure.

DETAILED DESCRIPTION

Reference will now be made in detail to the embodiments of the present disclosure, examples of which are illustrated in the accompanying drawings. The present disclosure may, however, be embodied in many different forms and should not be construed as being limited to the embodiments set forth herein; rather, these embodiments are provided so that this disclosure will be thorough and complete, and will fully convey the concept of the present disclosure to those skilled in the art. Like reference numerals in the drawings denote like elements.

System Overview

Figure 1:
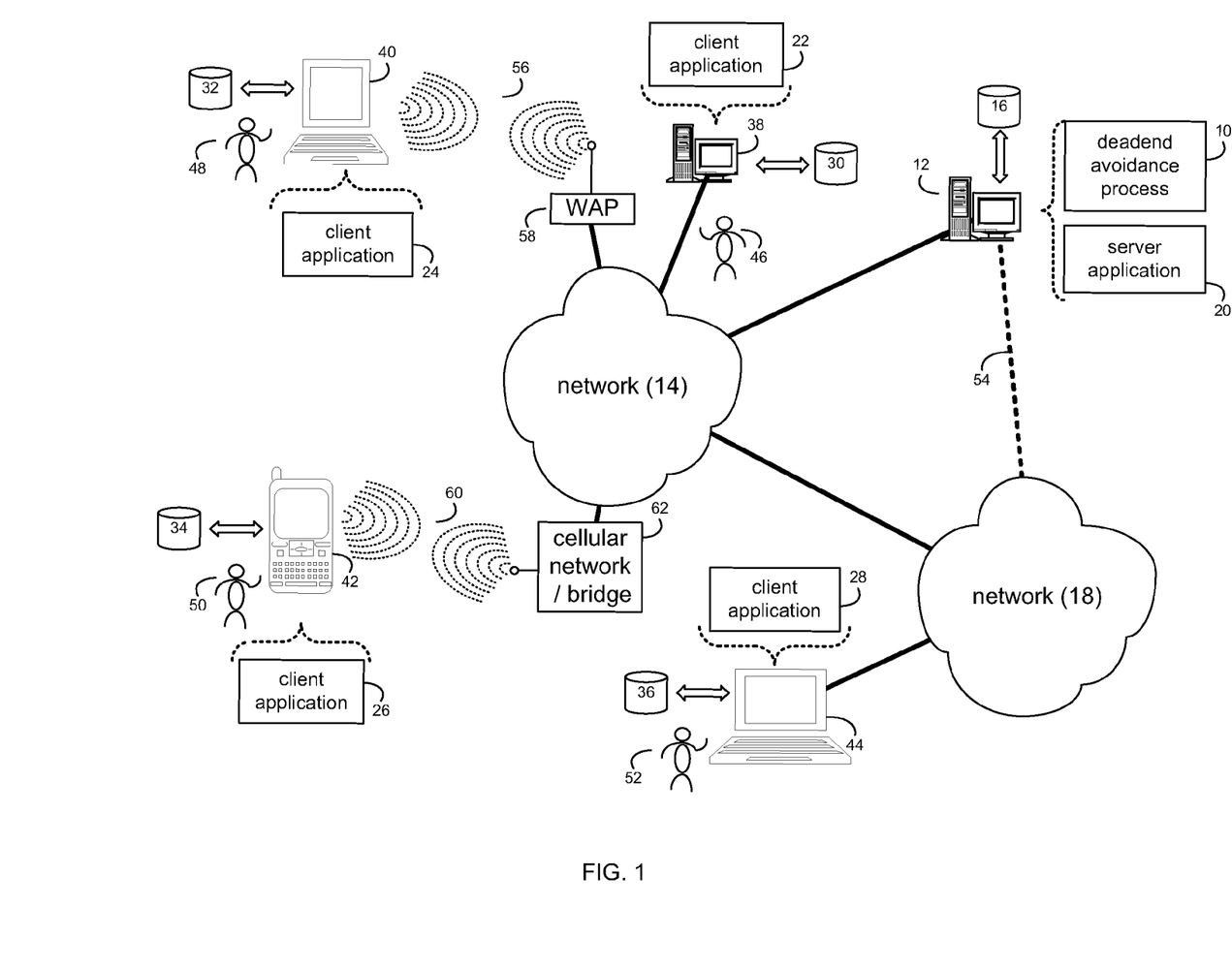
FIG. 1 diagrammatically depicts a deadend avoidance process coupled to a distributed computing network.

Referring to FIG. 1, there is shown deadend avoidance process 10 that may reside on and may be executed by server computer 12, which may be connected to network 14 (e.g., the internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example. Additionally and/or alternatively, the deadend avoidance process may reside on a client electronic device, such as a personal computer, notebook computer, personal digital assistant, or the like.

As will be discussed below in greater detail, deadend avoidance process 10 may be used to avoid deadends during a constrained simulation. In this way, the present disclosure may be used to avoid deadends on-the-fly, during the simulation. The methods described herein may utilize a variety of techniques, including, but not limited to, constraint solving and dead-end detection.

The instruction sets and subroutines of deadend avoidance process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS™, Novell Webserver™, or Apache Webserver™, that allows for HTTP (HyperText Transfer Protocol) access to server computer 12 via network 14. Network 14 may be connected to one or more secondary networks (e.g., network 18), examples of which may include but are not limited to: a local area network; a wide area network; or an intranet, for example.

Server computer 12 may execute one or more server applications (e.g., server application 20), examples of which may include but are not limited to, e.g., Lotus Domino™ Server and Microsoft Exchange™ Server. Server application 20 may interact with one or more client applications (e.g., client applications 22, 24, 26, 28) in order to execute deadend avoidance process 10. Examples of client applications 22, 24, 26, 28 may include, but are not limited to, design verification tools such as those available from the assignee of the present disclosure. These applications may also be executed by server computer 12. In some embodiments, deadend avoidance process 10 may be a stand-alone application that interfaces with server application 20 or may be an applet/application that is executed within server application 20.

The instruction sets and subroutines of server application 20, which may be stored on storage device 16 coupled to server computer 12, may be executed by one or more processors (not shown) and one or more memory architectures (not shown) incorporated into server computer 12.

As mentioned above, in addition/as an alternative to being a server-based application residing on server computer 12, the deadend avoidance process may be a client-side application (not shown) residing on one or more client electronic devices 38, 40, 42, 44 (e.g., stored on storage devices 30, 32, 34, 36, respectively). As such, the deadend avoidance process may be a stand-alone application that interfaces with a client application (e.g., client applications 22, 24, 26, 28), or may be an applet/application that is executed within a client application. As such, the deadend avoidance process may be a client-side process, a server-side process, or a hybrid client-side/server-side process, which may be executed, in whole or in part, by server computer 12, or one or more of client electronic devices 38, 40, 42, 44.

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), compact flash (CF) storage devices, secure digital (SD) storage devices, and memory stick storage devices. Examples of client electronic devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using client applications 22, 24, 26, 28, users 46, 48, 50, 52 may utilize formal analysis, testbench simulation, and/or hybrid technology features to verify a particular electronic device design.

Users 46, 48, 50, 52 may access server application 20 directly through the device on which the client application (e.g., client applications 22, 24, 26, 28) is executed, namely client electronic devices 38, 40, 42, 44, for example. Users 46, 48, 50, 52 may access server application 20 directly through network 14 or through secondary network 18. Further, server computer 12 (e.g., the computer that executes server application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (CSMA/CA) for path sharing. The various 802.11x specifications may use phase-shift keying (PSK) modulation or complementary code keying (CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, or a custom operating system.

Deadend Avoidance Process

A design (e.g., an electronic device design) may be viewed as a network of logic components in communication. These logic components may include, but are not limited to, AND gates, OR gates, NAND gates, NOR gates and other logic blocks and/or circuits. Logic components in a design may be connected by wires which may transfer signals between the logic components. Each signal may take a binary value (e.g., high or low, 1 or 0, etc.). The valuation of a signal is the action of assigning a signal to 1 or 0. Design signals may be classified as two types: (i) state signals and (ii) input signals.

State signals may be internal to the design while input signals may come from outside the design. Initially, state signals may be assigned. Input valuation maybe provided by a testbench and constraints. A testbench may be a virtual environment used to verify the correctness of a design. Valuation of the design may be the process of applying both the state and input valuation to the logic components. The logic components may, in turn, assign new values to the state signals. This process, which may be referred to as design valuation, may be a core component in simulation.

In some embodiments of the present disclosure, constraints may be used to define the design environment. The present disclosure may apply to constrained random simulation in the simulation and/or formal hybrid verification, where constraints may be in the form of one or more assertion languages. The assertion languages may include, but are not limited to, Portable Specification Language (PSL) and SystemVerilog Assertions (SVA). The constraints may also be in the form of testbench based simulation and may be written in High Level Verification languages such as 'e' or SystemVerilog Randomization constructs. Further, embodiments of the present disclosure may use a constraint solver to perform various operations. The constraint solver may use the combinational and/or sequential PSL and/or SVA constraints as inputs and may generate simulation traces that meet those constraints.

Constraints may be logical statements that may specify the behavior of signals in a design. For example, consider the following constraint:

trans_start==1→data_valid==1

This constraint may state that, if the signal "trans_start" is 1, then the signal "data_valid" is also 1. Assume for illustrative purposes that "trans_start" is a state signal (e.g., internal to the design) and that "trans_data" is an input signal (e.g., comes from outside the design). During simulation of the design, valuation of "trans_start" may be controlled by the design itself, while valuation of "trans_data" may be the result of applying the signal "trans_start" to the constraint and solving the constraint. A simulation may include multiple constraints. For a given valuation of state signals, constraint solving may return a valuation of the input signals that satisfy all the constraints.

Some sets of constraints in connection with a design simulation may have no input valuation that satisfies all the constraints. A deadend may be a state valuation for which there is no input valuation that satisfies all the constraints. When a deadend is encountered during a design simulation, the constraint solver may be unable to provide an input valuation to the simulator, and the simulation may be stalled. In some situations, a design simulation may abort when a deadend is encountered. For example, the two constraints below may cause a deadend:

a==1→c==1 b==1→c==1

If the above constraints were included in a design simulation and 'a' and 'b' are both 1, the two constraints may force 'c' to take the conflicting value 1 and 0, which may cause a deadend state (e.g., a deadend).

Figure 2:
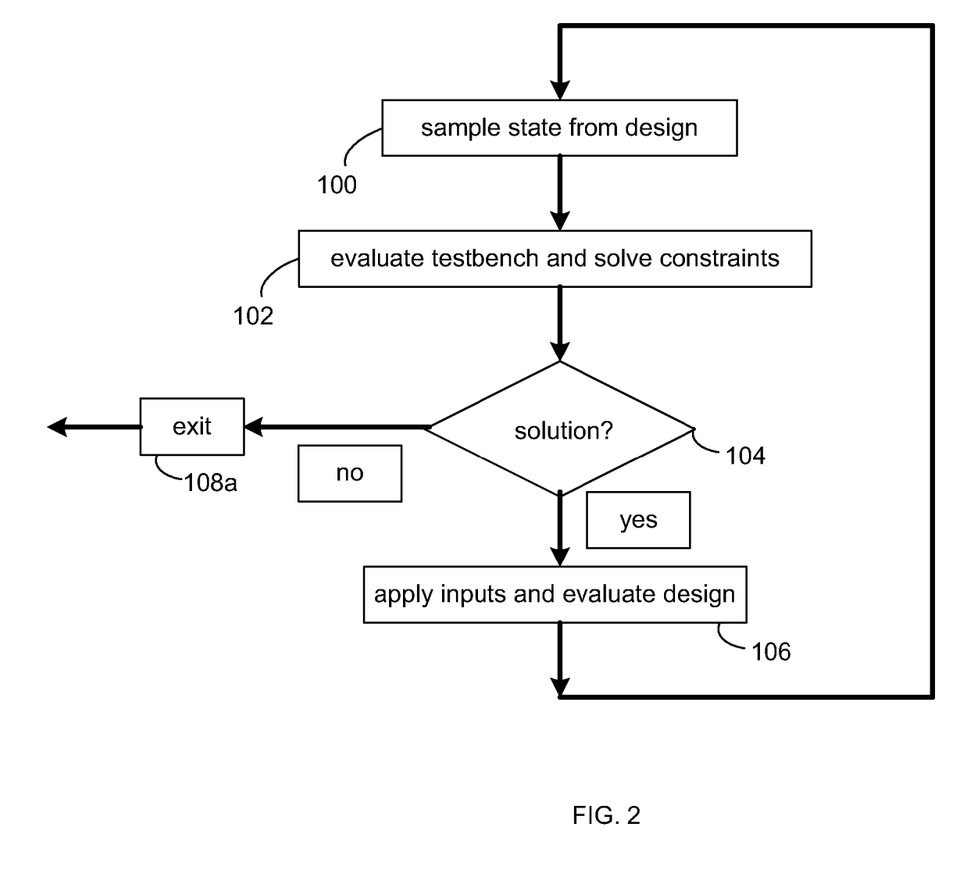
FIG. 2 is a flowchart illustrating a constrained simulation method in accordance with the present disclosure.

Referring now to FIG. 2, a constrained simulation, which may run in connection with a client application (e.g., client application 22) is shown. For illustrative purposes client application 22 will be discussed. However, this should not be construed as a limitation of the present disclosure, as other client applications (e.g., client applications 24, 26, 28) may be equally utilized.

Constrained simulation may include a number of operations which may be described below. In general, constrained simulation goes cycle by cycle. In a cycle simulation, every gate may be evaluated in every cycle. In the constrained simulation, the current design state may be sampled 100. In other words, the values of the design signals may be sampled. The testbench may be evaluated and the constraints may be solved 102. After this operation, an input valuation may be acquired. If there is an input valuation that solves the constraints (e.g., if there is a solution (104)), the input valuation may be applied 106 and the design may be evaluated. If, however, the current sample is a state valuation for which there is no input valuation that satisfies all the constraints (e.g., there is no solution (104)) the constrained simulation may have encountered a deadend, and the simulation may be exited (108a). At this point the designer may modify the constraints and/or the design to remove the deadend, and may then resume the simulation.

Figure 3:
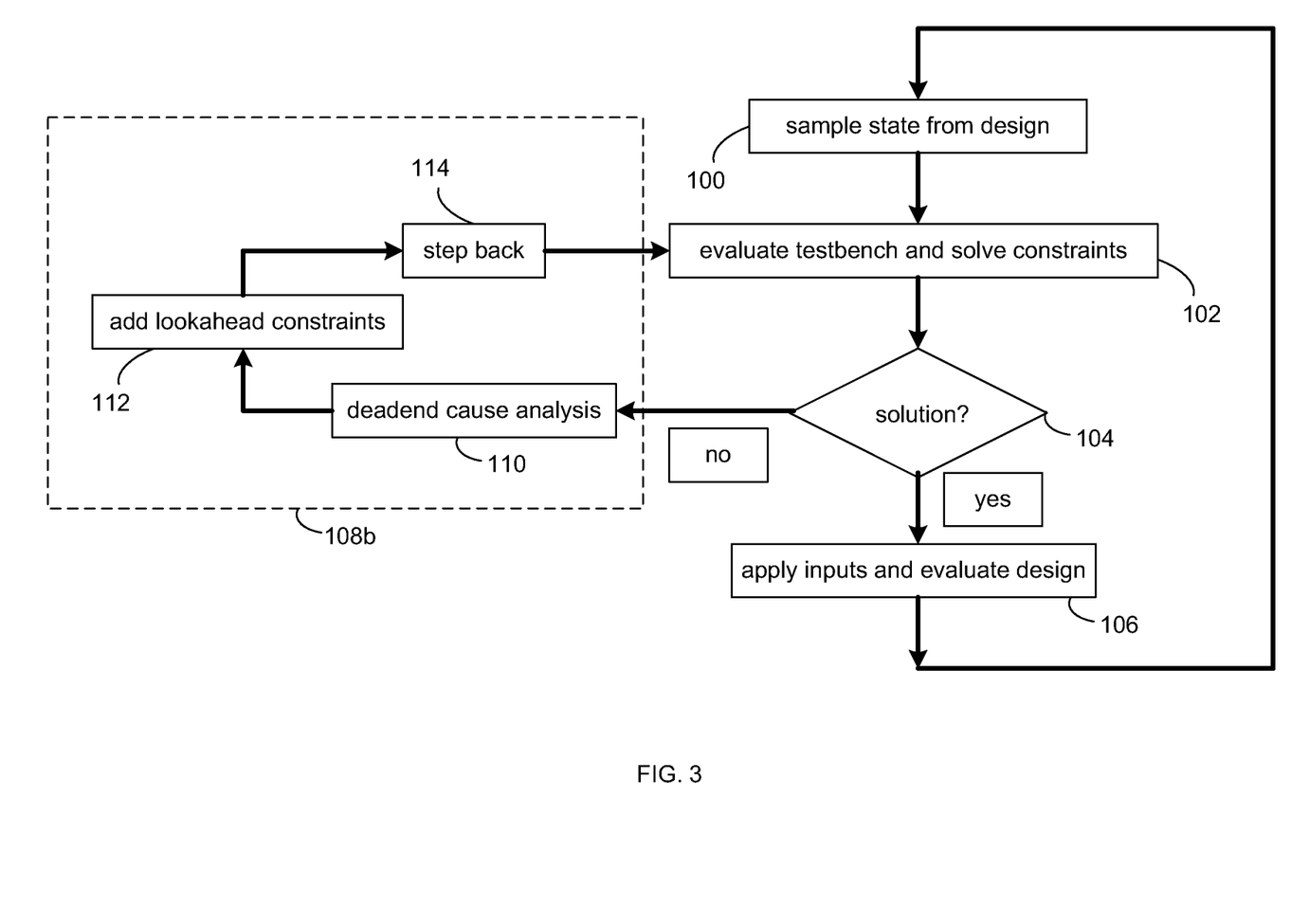
FIG. 3 is a flowchart illustrating a constrained simulation method including an adaptive deadend pruning method in accordance with the present disclosure.

Referring now to FIG. 3, a constrained simulation including adaptive deadend pruning (108b) is shown. The constrained simulation including adaptive deadend pruning may also run in connection with a client application (e.g., client application 22). As shown in FIG. 3, instead of exiting (108a) the simulation for the designer to manually modify constraints and/or the design to remove the deadend, adaptive deadend pruning (108b) may automatically resolve the deadend issue. Adaptive deadend pruning (108b) may be an automated process that analyzes the constraints and the design in order to find a way to avoid a deadend in a simulation. Adaptive deadend pruning may be triggered once the simulation has encountered a deadend. For example, if the current sample is a state valuation for which there is no input valuation that satisfies all the constraints (e.g., there is no solution (104)), the constrained simulation may run a deadend cause analysis operation 110.

Deadend cause analysis operation 110 may analyze the deadend and constraints to find one or more constraints that may be responsible for the deadend. Once these responsible constraints are found, one or more lookahead constraints corresponding to the one or more responsible constraints may be created. Adaptive deadend pruning (108b) may then add 112 the lookahead constraints corresponding to the constraints responsible for the deadend. Further, adaptive deadend pruning may step back 114 the simulation to a cycle before the deadend was encountered, apply the lookahead constraints, and step forward in the simulation. In this way, adaptive deadend pruning (108b) may avoid the deadend with the one or more lookahead constraints.

Assume for exemplary purposes that there is a constraint P in a design simulation. A lookahead of constraint P for n clock cycles may be derived by unfolding (e.g., replacing registers with their input logic) the driving logic of constraint P for n times. An application of this lookahead constraint at a simulation cycle may be equivalent to the application of constraint P n cycles later. Constraint lookahead may be performed on-the-fly during simulation. In other words, only the deadends that are encountered may be dealt with by using lookahead constraints. When a deadend state is encountered during the simulation, a minimal set of constraints (e.g., one or more) responsible for the deadend state may be identified, and one or more lookahead constraints may be created. In this way, only the minimal number of lookahead constraints may be used, and time and resources may be saved.

A constrained simulation of a design may encounter more than one deadend. For example, after stepping back 114 the simulation to avoid the deadend with the one or more lookahead constraints, the simulation may evaluate the testbench and solve 102 the constraints again. This may lead to another deadend, which may trigger adaptive deadend pruning operation (108b) again. In this way, the constrained simulation may iteratively apply adaptive deadend pruning (108b) each time it encounters a deadend, and may avoid all the deadends during the constrained simulation.

Figure 4:
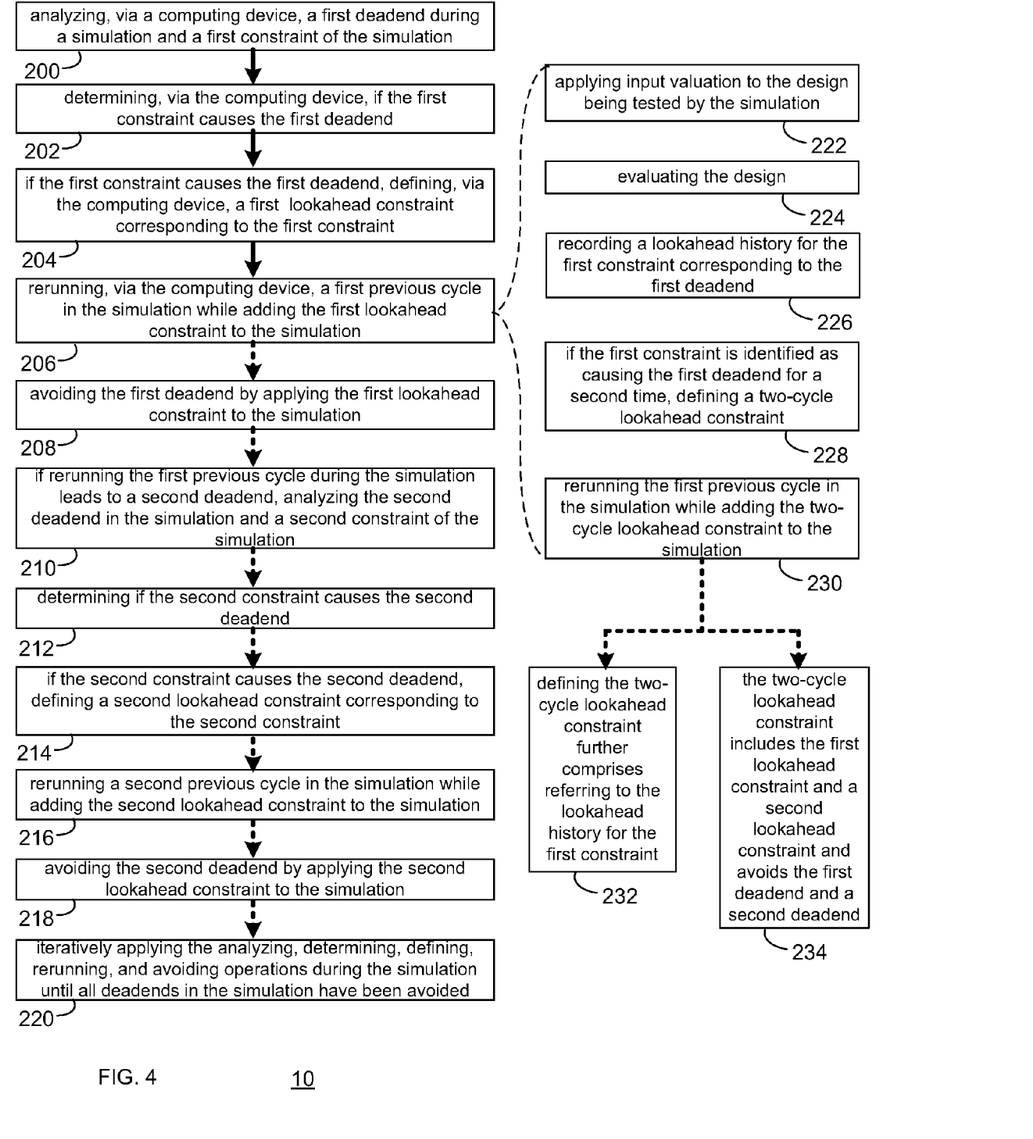
FIG. 4 a flowchart of the deadend avoidance process in accordance the present disclosure.
Figure 5:
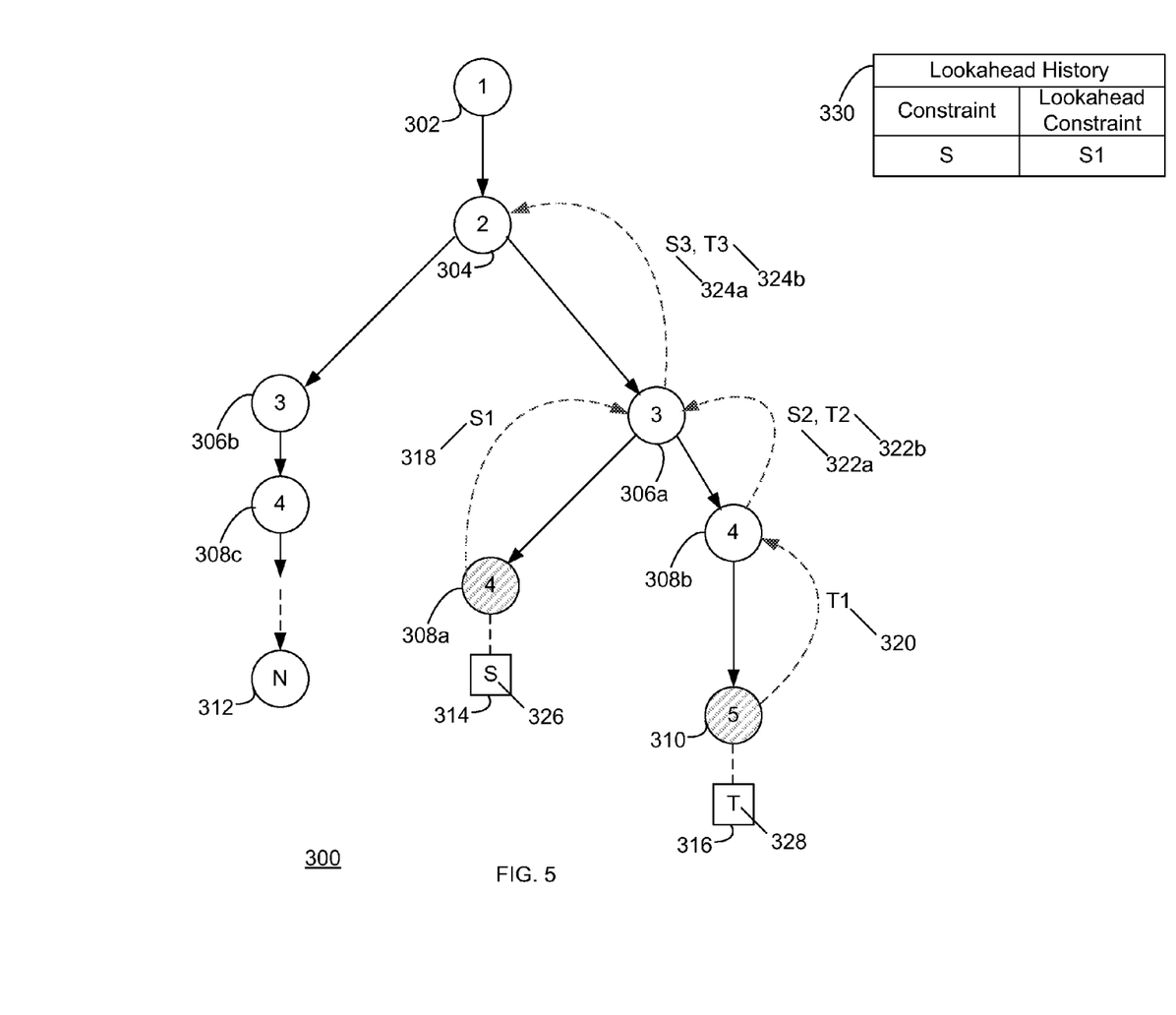
FIG. 5 depicts an example run of the deadend avoidance process in accordance with the present disclosure.

Referring now to FIG. 4, an embodiment of the present disclosure may include deadend avoidance process 10. Deadend avoidance process 10 may include adaptive deadend pruning techniques such as those discussed above. Referring now also to FIG. 5, an example run of deadend avoidance process 10 running in connection with constrained simulation 300 is depicted. Deadend avoidance process 10 may also run in connection with a client application (e.g., client application 22). Deadend avoidance process 10 may analyze a first deadend (e.g., deadend 314) during a simulation (e.g., constrained simulation 300) and a first constraint (e.g., constraint 326) of the simulation.

As shown in FIG. 5, constrained simulation 300 may run simulation cycle 1 (e.g., cycle 302) and may follow three paths at simulation cycle 2 (e.g., cycle 304). In a first path, it may go left towards an infinite path (e.g., at cycle 312 shown as cycle N). Alternatively, it may right towards two deadends (e.g., deadends 314 and 316). For example, in a second path, on the right side at cycle 3 (e.g., cycle 306a), it may go left to deadend 314 at cycle 4 (e.g., cycle 308a). It may also go right, in a third path, to deadend 316 at cycle 5 (e.g., cycle 310). In constrained simulation 300 at cycle 2 (e.g., cycle 304) if the simulation follows left to an infinite path (e.g., as indicated by cycle 312 shown as N), constrained simulation 300 may never encounter a deadend, and may not use deadend avoidance process 10. In other words, no lookahead constraints may ever be needed and the constrained simulation may apply the input valuation and evaluate the design.

For exemplary purposes, assume constrained simulation 300 follows right at cycle 2 (e.g., cycle 304), and follows left at cycle 3 (e.g., cycle 306a). In this situation, constrained simulation 300 may encounter deadend 314 at cycle 4 (e.g., cycle 308a). Once a deadend is encountered, constrained simulation 300 may use deadend avoidance process 10 to avoid the deadend. Deadend avoidance process 10 may analyze 200 a first deadend (e.g., deadend 314) during a simulation (e.g., constrained simulation 300) and a first constraint (e.g., constraint 326, shown as S) of the simulation (e.g., constrained simulation 300). Further, deadend avoidance process 10 may determine 202 if the first constraint (e.g., constraint 326, shown as S) causes the first deadend (e.g., deadend 314). While constraint 326 may be determined 202 to cause deadend 314 in this example, other situations are possible. For example, deadend avoidance process 10 may check a plurality of constraints corresponding to constrained simulation 300 before finding the constraint that causes a particular deadend (e.g., deadend 314).

If the first constraint (e.g., constraint 326, shown as S) causes the first deadend (e.g., deadend 314), deadend avoidance process 10 may define 204 a first lookahead constraint (e.g., lookahead constraint 318, shown as S1) corresponding to the first constraint (e.g., constraint 326, shown as S). Further, deadend avoidance process 10 may rerun 206 a first previous cycle (e.g., cycle 306a) in the simulation (e.g., constrained simulation 300) while adding the first lookahead constraint (e.g., lookahead constraint 318, shown as S1) to the simulation (e.g., constrained simulation 300). In this way, lookahead constraint 318 (e.g., S1) may be applied to constrained simulation 300 to counter constraint 326 (e.g., S). Deadend avoidance process 10 may avoid 208 the first deadend (e.g., deadend 314) by applying the first lookahead constraint (e.g., S1) to the simulation (e.g., constrained simulation 300). Lookahead constraint 318 may be referred to as a one-cycle lookahead constraint.

While constraint 326 is discussed in this example as causing deadend 314, this is not intended to be a limitation of the present disclosure. For example, deadend avoidance process 10 may determine that more than one constraint, or a set of constraints cause deadend 314. In this situation, deadend avoidance process 10 may define more than one lookahead constraint, or a set of lookahead constraints, which may be applied to the constrained simulation to counter constraint 326 and avoid deadend 314.

Deadend avoidance process 10 may rerun cycle 3 (e.g., cycle 306a) of constrained simulation 300 with lookahead constraint 318, and lookahead constraint 318 (e.g., S1) may steer constrained simulation 300 to the right to cycle 4 (e.g., cycle 308b with lookahead constraint S1 applied). This time, constrained simulation 300 may not approach deadend 314 because lookahead constraint 318 (e.g., S1) has been applied. Instead, constrained simulation 300 may approach a second deadend (e.g., deadend 316) at cycle 5 (e.g., cycle 310). If rerunning the first previous cycle (e.g., cycle 306a) during the simulation (e.g., constrained simulation 300) leads to a second deadend (e.g., deadend 316), deadend avoidance process 10 may analyze 210 the second deadend (e.g., deadend 316) in the simulation (e.g., constrained simulation 300) and a second constraint (e.g., constraint 328) of the simulation (e.g., constrained simulation 300). Further, deadend avoidance process 10 may determine 212 if the second constraint (e.g., constraint 328) causes the second deadend (e.g., deadend 316). While constraint 328 may be determined 212 to cause deadend 316 in this example, other situations are possible. For example, and as discussed above, deadend avoidance process 10 may check a plurality of constraints corresponding to constrained simulation 300 before finding the one or more constraints that may cause a particular deadend (e.g., deadend 316).

If the second constraint (e.g., constraint 328, shown as T) causes the second deadend (e.g., deadend 316), deadend avoidance process 10 may define 214 a second lookahead constraint (e.g., lookahead constraint 320 shown as T1) corresponding to the second constraint (e.g., constraint 328, shown as T). Further, deadend avoidance process 10 may rerun 216 a second previous cycle (e.g., cycle 308b) in the simulation (e.g., constrained simulation 300) while adding the second lookahead constraint (e.g., lookahead constraint 320 shown as T1) to the simulation (e.g., constrained simulation 300). In some situations deadend avoidance process 10 may avoid 218 the second deadend (e.g., deadend 316) by applying the second lookahead constraint (e.g., lookahead constraint 320 shown as T1) to the simulation (e.g., constrained simulation 300). In this way, deadend avoidance process 10 may iteratively apply (220) the analyzing (e.g., 200, 210), determining (e.g., 202, 212), defining (e.g., 204, 214), rerunning (e.g., 206, 216) and avoiding (e.g., 208, 218) operations during the simulation (e.g., constrained simulation 300) until all deadends (e.g., deadends 314, 316) in the simulation (e.g., constrained simulation 300) have been avoided.

It should be noted that while deadend avoidance process 10 is discussed in this example as rerunning the previous cycle and applying one or more lookahead constraints, other operations are possible. For example, one or more previous states may be saved during the constrained simulation. These previous states may then be revisited at any time to further test the state and/or apply lookahead constraints.

Continuing with the example above, assume for exemplary purposes that deadend avoidance process 10 did not avoid 218 the second deadend (e.g., deadend 316) after applying the second lookahead constraint (e.g., lookahead constraint 320 shown as T1). This situation may occur in the example run shown in FIG. 5. For example, when deadend avoidance process 10 reruns cycle 308b (e.g., cycle 4) while applying lookahead constraint 318 and 320 (e.g., S1 and T1) constrained simulation 300 may encounter deadend 316 again. In this example, lookahead constraints 318 and 320 (e.g., S1 and T1) may both be applied during the rerunning of constrained simulation 300 at cycle 308b (e.g., cycle 4), and deadend avoidance process 10 may find that lookahead constraints S1 and T1 are themselves conflicting constraints. To avoid deadend 316, deadend avoidance process 10 may create and add lookahead constraints 322a and 322b (e.g., S2 and T2) to constrained simulation 300 and may rerun (e.g., step back) constrained simulation 300 from cycle 306a (e.g., cycle 3). In this way, deadend avoidance process 10 may iteratively find conflicting constraints, add lookahead constraints, and rerun (e.g., step back) constrained simulation 300 in order to avoid deadends.

For example, constrained simulation 300 may encounter deadend 316 again, as deadend avoidance process 10 may find that lookahead constraints S2 and T2 are also conflicting constraints. Deadend avoidance process 10 may then create and add lookahead constraints 324a and 324b (e.g., S3 and T3) to constrained simulation 300 and may rerun (e.g., step back) constrained simulation 300 from cycle 2 (e.g., cycle 304). With lookahead constraints 318, 320, 322a, 322b, 324a, and 324b added, as shown in FIG. 5, constrained simulation 300 may rerun (e.g., step back) at cycle 2 (e.g., cycle 304) and may be forced to take the left branch and move on through cycle 3 (e.g., cycle 306b) and cycle 4 (e.g., cycle 308c) to the Nth cycle (e.g., cycle 312). In other words, no other lookahead constraints may be necessary, and deadend avoidance process 10 may apply 222 input valuation to a design being tested by the simulation and may evaluate 224 the design.

Deadend avoidance process 10 may record 226 a lookahead history (e.g., lookahead history 330) for the first constraint (e.g., constraint 326) corresponding to the first deadend (e.g., deadend 314). Deadend avoidance process 10 may maintain a lookahead history for each constraint in constrained simulation 300. The lookahead history may include one or more lookahead constraints created by deadend avoidance process 10 and the constraint that each lookahead constraint may correspond to. Deadend avoidance process 10 may analyze each constraint by checking its lookahead history. In this way, deadend avoidance process 10 may reduce the number of constraints that need lookahead.

If the first constraint (e.g., constraint 326) is identified as causing the first deadend (e.g., deadend 314) for a second time, deadend avoidance process 10 may define 228 a two-cycle lookahead constraint (e.g., a combination of lookahead constraints 318 and 320, shown as S1 and T1 in FIG. 5). Further, deadend avoidance process 10 may rerun 230 the first previous cycle (e.g., cycle 306a) in the simulation (e.g., constrained simulation 300) while adding the two-cycle lookahead constraint (e.g., the combination of S1 and T1) to the simulation (e.g., constrained simulation 300). Defining the two-cycle lookahead constraint (e.g., the combination of S1 and T1) may include referring 232 to the lookahead history (e.g. lookahead history 330) for the first constraint (e.g., constraint 326). The two-cycle lookahead constraint (e.g., combination of S1 and T1) may include (234) the first lookahead constraint (e.g., S1) and a second lookahead constraint (e.g., T1) and may avoid the first deadend (e.g., deadend 314) and a second deadend (e.g., deadend 316). Further, the third time a constraint may be identified as causing a deadend, a three-cycle lookahead constraint may be created. In this way, deadend avoidance process 10 may define an N-cycle lookahead constraint to avoid deadends during a constrained simulation.

While deadend avoidance process 10 is described above as avoiding deadends in a constrained simulation (e.g., constrained simulation 300) that encounters two deadends (e.g., deadends 314 and 316), this is not intended to be a limitation of the present disclosure. For example, using the features and techniques described above, deadend avoidance process 10 may avoid more than two deadends in a constrained simulation that encounters more than two deadends. In this way deadend avoidance process 10 may avoid any number of deadends encountered in a constrained simulation.

It will be apparent to those skilled in the art that various modifications and variations can be made in the deadend avoidance scheme for constrained simulation discussed in the present disclosure without departing from the spirit or scope of the invention. Thus, it is intended that embodiments of the present disclosure cover the modifications and variations of this invention provided they come within the scope of the appended claims and their equivalents.

What is claimed is:

1. A method comprising:
analyzing, via a computing device, a first deadend during a simulation and a first constraint of the simulation, wherein analyzing includes automatically analyzing one or more constraints and an electronic design in order to avoid a deadend in the simulation;
determining, during the simulation, via the computing device, if the first constraint causes the first deadend;
if the first constraint causes the first deadend, defining, during the simulation, via the computing device, a first lookahead constraint corresponding to the first constraint;
rerunning, via the computing device, a first previous cycle in the simulation while adding the first lookahead constraint to the simulation;
avoiding the first deadend by applying the first lookahead constraint to the simulation;
if rerunning the first previous cycle during the simulation leads to a second deadend, analyzing the second deadend in the simulation and a second constraint of the simulation;
determining if the second constraint causes the second deadend;
if the second constraint causes the second deadend, defining a second lookahead constraint corresponding to the second constraint;
rerunning a second previous cycle in the simulation while adding the second lookahead constraint to the simulation; and
avoiding the second deadend by applying the second lookahead constraint to the simulation.

2. The method of claim 1, further comprising:
iteratively applying the analyzing, determining, defining, rerunning, and avoiding operations during the simulation until all deadends in the simulation have been avoided.

3. The method of claim 1, further comprising:
applying input valuation to the design being tested by the simulation; and
evaluating the design.

4. The method of claim 1, further comprising:
recording a lookahead history for the first constraint corresponding to the first deadend.

5. The method of claim 4, further comprising:
if the first constraint is identified as causing the first deadend for a second time, defining a two-cycle lookahead constraint; and
rerunning the first previous cycle in the simulation while adding the two-cycle lookahead constraint to the simulation.

6. The method of claim 5, wherein defining the two-cycle lookahead constraint further comprises referring to the lookahead history for the first constraint.

7. The method of claim 5 wherein the two-cycle lookahead constraint includes the first lookahead constraint and a second lookahead constraint and avoids the first deadend and a second deadend.

8. A non-transitory computer-readable storage device having stored thereon instructions, which when executed by a processor result in the following operations:
analyzing a first deadend during a simulation and a first constraint of the simulation, wherein analyzing includes automatically analyzing one or more constraints and an electronic design in order to avoid a deadend in the simulation;
determining, during the simulation, if the first constraint causes the first deadend;
if the first constraint causes the first deadend, defining, during the simulation, a first lookahead constraint corresponding to the first constraint;
rerunning a first previous cycle in the simulation while adding the first lookahead constraint to the simulation;
avoiding the first deadend by applying the first lookahead constraint to the simulation;
if rerunning the first previous cycle during the simulation leads to a second deadend, analyzing the second deadend in the simulation and a second constraint of the simulation;
determining if the second constraint causes the second deadend;
if the second constraint causes the second deadend, defining a second lookahead constraint corresponding to the second constraint;
rerunning a second previous cycle in the simulation while adding the second lookahead constraint to the simulation; and
avoiding the second deadend by applying the second lookahead constraint to the simulation.

9. The non-transitory computer-readable storage device of claim 8 wherein operations further comprise:
iteratively applying the analyzing, determining, defining, rerunning, and avoiding operations during the simulation until all deadends in the simulation have been avoided.

10. The non-transitory computer-readable storage device of claim 8 wherein operations further comprise:
applying input valuation to the design being tested by the simulation; and
evaluating the design.

11. The non-transitory computer-readable storage device of claim 8 wherein operations further comprise:
recording a lookahead history for the first constraint corresponding to the first deadend.

12. The non-transitory computer-readable storage device of claim 11 wherein operations further comprise:
if the first constraint is identified as causing the first deadend for a second time, defining a two-cycle lookahead constraint; and
rerunning the first previous cycle in the simulation while adding the two-cycle lookahead constraint to the simulation.

13. The non-transitory computer-readable storage device of claim 12 wherein operations for defining the two-cycle lookahead constraint further comprise referring to the lookahead history for the first constraint.

14. The non-transitory computer-readable storage device of claim 12 wherein the two-cycle lookahead constraint includes the first lookahead constraint and a second lookahead constraint and avoids the first deadend and a second deadend.

15. A computing system comprising:
at least one processor;
at least one memory architecture coupled with the at least one processor;
a first software module executed by the at least one processor, wherein the first software module is configured to analyze a first deadend during a simulation and a first constraint of the simulation, wherein analyzing includes automatically analyzing one or more constraints and an electronic design in order to avoid a deadend in the simulation;
a second software module executed by the at least one processor, wherein the second software module is configured to determine, during the simulation, if the first constraint causes the first deadend;
a third software module executed by the at least one processor, wherein the third software module is configured to, if the first constraint causes the first deadend, define, during the simulation, a first lookahead constraint corresponding to the first constraint;
a fourth software module executed by the at least one processor, wherein the fourth software module is configured to rerun a first previous cycle in the simulation while adding the first lookahead constraint to the simulation;
a fifth software module executed by the at least one processor, wherein the fifth software module is configured to avoid the first deadend by applying the first lookahead constraint to the simulation;
a sixth software module executed by the at least one processor, wherein the sixth software module is configured to, if rerunning the first previous cycle during the simulation leads to a second deadend, analyze the second deadend in the simulation and a second constraint of the simulation;
a seventh software module executed by the at least one processor, wherein the seventh software module is configured to determine if the second constraint causes the second deadend;
an eighth software module executed by the at least one processor, wherein the eighth software module is configured to, if the second constraint causes the second deadend, define a second lookahead constraint corresponding to the second constraint;
a ninth software module executed by the at least one processor, wherein the ninth software module is configured to rerun a second previous cycle in the simulation while adding the second lookahead constraint to the simulation; and
a tenth software module executed by the at least one processor, wherein the tenth software module is configured to avoid the second deadend by applying the second lookahead constraint to the simulation.

16. The computing system of claim 15 further comprising:
an eleventh software module executed by the at least one processor, wherein the eleventh software module is configured to iteratively apply the first, second, third, fourth, fifth, sixth, seventh, eighth, ninth, and tenth software modules during the simulation until all deadends in the simulation have been avoided.

17. The computing system of claim 15 further comprising:
a twelfth software module executed by the at least one processor, wherein the twelfth software module is configured to apply input valuation to the design being tested by the simulation; and a thirteenth software module executed by the at least one processor, wherein the thirteenth software module is configured to evaluate the design.

18. The computing system of claim 15 further comprising:

a fourteenth software module executed by the at least one processor, wherein the fourteenth software module is configured to record a lookahead history for the first constraint corresponding to the first deadend.

19. The computing system of claim 18 further comprising:

a fifteenth software module executed by the at least one processor, wherein the fifteenth software module is configured to, if the first constraint is identified as causing the first deadend for a second time, define a two-cycle lookahead constraint; and a sixteenth software module executed by the at least one processor, wherein the sixteenth software module is configured to rerun the first previous cycle in the simulation while adding the two-cycle lookahead constraint to the simulation.

20. The computing system of claim 19 wherein defining the two-cycle lookahead constraint further comprises referring to the lookahead history for the first constraint.

21. The computing system of claim 19 wherein the two-cycle lookahead constraint includes the first lookahead constraint and a second lookahead constraint and avoids the first deadend and a second deadend.

\* \* \* \* \*

UNITED STATES PATENT AND TRADEMARK OFFICE
CERTIFICATE OF CORRECTION

| | | |
|---|---|---|
| PATENT NO. | : 8,671,395 B1 | Page 1 of 1 |
| APPLICATION NO. | : 12/879458 | |
| DATED | : March 11, 2014 | |
| INVENTOR(S) | : Jun Yuan et al. | |

It is certified that error appears in the above-identified patent and that said Letters Patent is hereby corrected as shown below:

On the Title Page

On page 1 of the subject issued patent, item (75) should be corrected to read as follows:

Jun Yuan, San Ramon, CA (US); Alok Jain, New Delhi (IN); Manpreet Singh Reehal, Mohali (IN); Vinaya Kumar Singh, Noida (IN)

Signed and Sealed this
Twenty-fourth Day of June, 2014

Michelle K. Lee
*Deputy Director of the United States Patent and Trademark Office*